United States Patent
Sueshige et al.

(10) Patent No.: US 8,733,210 B2
(45) Date of Patent: May 27, 2014

(54) CONTROL APPARATUS FOR AUTOMATIC TRANSMISSION

(75) Inventors: Keiichiro Sueshige, Hiroshima (JP); Akihiro Mitani, Higashihiroshima (JP); Tatsutoshi Mizobe, Hiroshima (JP); Shotaro Nagai, Hiroshima (JP); Takenori Kawano, Hiroshima (JP); Takahiro Kimura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 207 days.

(21) Appl. No.: 12/938,192

(22) Filed: Nov. 2, 2010

(65) Prior Publication Data

US 2011/0232409 A1 Sep. 29, 2011

(30) Foreign Application Priority Data

Mar. 9, 2010 (JP) ................. 2010-051480

(51) Int. Cl.
*F16H 61/00* (2006.01)
(52) U.S. Cl.
USPC ..................... 74/730.1; 74/606 R
(58) Field of Classification Search
CPC ............ F16H 61/0251; F16H 61/0286; F16H 61/0255; F16H 2057/0335; F16H 61/0009; F16H 2057/02047; F16H 2057/02043; F16H 61/0003; F16H 61/061
USPC .......... 74/473.11, 730.1, 731.1, 732.1, 733.1, 74/34, 346, 364, 365; 475/116, 123, 128, 475/132; 477/52–69; 251/129.15–129.22; 137/884; 301/119.3
See application file for complete search history.

(56) References Cited

U.S. PATENT DOCUMENTS

| | | | | |
|---|---|---|---|---|
| 2,202,866 A | * | 6/1940 | Price | 74/334 |
| 4,083,266 A | * | 4/1978 | Kreitzberg | 74/606 R |
| 4,271,728 A | * | 6/1981 | Wakamatsu | 477/34 |
| 4,660,125 A | * | 4/1987 | Purdy et al. | 361/727 |
| 4,678,006 A | * | 7/1987 | Northman et al. | 137/596.17 |

(Continued)

FOREIGN PATENT DOCUMENTS

| | | |
|---|---|---|
| DE | 19955437 A1 | 5/2001 |
| DE | 10110620 A1 | 9/2002 |

(Continued)

OTHER PUBLICATIONS

German Patent and Trademark Office, Office Action of DE102010051533.7-14, Apr. 27, 2012, Germany, 13 pages.

*Primary Examiner* — Troy Chambers
*Assistant Examiner* — Valentin Craciun
(74) *Attorney, Agent, or Firm* — Alleman Hall McCoy Russell & Tuttle LLP

(57) ABSTRACT

There is provided, in one aspect of the present description, an automatic transmission. In one example, the automatic transmission comprises a transmission case, a valve body which is arranged in the transmission case, a control valve mechanism which controls oil pressures in parts of the automatic transmission and is installed in the valve body, and a solenoid valve which is attached to the valve body and is arranged at a first side of the valve body and in the transmission case. The automatic transmission further comprises an electronic control unit which controls the solenoid valve, is attached to the valve body, and is arranged at a second side of the valve body that is opposite to the first side across the valve body.

7 Claims, 4 Drawing Sheets

(56) References Cited

U.S. PATENT DOCUMENTS

| | | | | |
|---|---|---|---|---|
| 4,805,490 | A * | 2/1989 | Fuehrer et al. | 74/606 R |
| 5,305,663 | A * | 4/1994 | Leonard et al. | 475/123 |
| 5,386,337 | A * | 1/1995 | Schoettl | 361/622 |
| 5,611,372 | A * | 3/1997 | Bauer et al. | 137/884 |
| 5,662,007 | A * | 9/1997 | Starker et al. | 74/606 A |
| 5,680,883 | A * | 10/1997 | Gluf, Jr. | 137/884 |
| 5,692,909 | A * | 12/1997 | Gadzinski | 439/34 |
| 5,876,235 | A * | 3/1999 | Yoshigi | 439/384 |
| 5,937,898 | A * | 8/1999 | Gluf et al. | 137/560 |
| 5,941,282 | A * | 8/1999 | Suzuki et al. | 137/884 |
| 6,155,137 | A * | 12/2000 | Nassar et al. | 74/606 R |
| 6,164,160 | A * | 12/2000 | Nassar | 74/606 R |
| 6,300,565 | B1 * | 10/2001 | Loibl et al. | 174/520 |
| 6,488,601 | B1 * | 12/2002 | Sommer et al. | 474/70 |
| 6,504,262 | B1 * | 1/2003 | Aoki et al. | 307/10.1 |
| 6,530,856 | B1 * | 3/2003 | Kakiage | 475/123 |
| 6,544,138 | B2 * | 4/2003 | True et al. | 475/116 |
| 6,679,137 | B1 | 1/2004 | Bek | |
| 6,695,748 | B2 * | 2/2004 | Kopec et al. | 477/130 |
| 6,715,510 | B2 * | 4/2004 | Herbert | 137/884 |
| 7,073,410 | B2 * | 7/2006 | Albert | 74/606 R |
| 7,086,308 | B2 * | 8/2006 | Suzuki et al. | 74/606 R |
| 7,782,627 | B2 * | 8/2010 | Gramann et al. | 361/752 |
| 7,909,721 | B2 * | 3/2011 | Seid et al. | 475/116 |
| 8,210,975 | B2 * | 7/2012 | Mizobe et al. | 475/61 |
| 2001/0003289 | A1 * | 6/2001 | Mead et al. | 137/884 |
| 2002/0157502 | A1 * | 10/2002 | Albert et al. | 74/731.1 |
| 2003/0230285 | A1 * | 12/2003 | Lee et al. | 123/470 |
| 2004/0045614 | A1 * | 3/2004 | Subramanian et al. | 137/884 |
| 2004/0118466 | A1 * | 6/2004 | Ford et al. | 137/884 |
| 2004/0154822 | A1 * | 8/2004 | Matsuda et al. | 174/72 A |
| 2006/0030453 | A1 * | 2/2006 | Yokoyama et al. | 477/37 |
| 2006/0032541 | A1 * | 2/2006 | Ford et al. | 137/884 |
| 2007/0078036 | A1 * | 4/2007 | Morise | 475/159 |
| 2008/0011733 | A1 * | 1/2008 | Rawlings | 219/219 |
| 2008/0132381 | A1 * | 6/2008 | Seid et al. | 477/98 |
| 2008/0142145 | A1 * | 6/2008 | Xu et al. | 156/73.2 |
| 2009/0088281 | A1 * | 4/2009 | Mizobe et al. | 475/123 |
| 2009/0114865 | A1 * | 5/2009 | Homann et al. | 251/129.15 |
| 2009/0301803 | A1 * | 12/2009 | Oblizajek et al. | 180/444 |
| 2012/0241034 | A1 * | 9/2012 | Wilke et al. | 137/597 |

FOREIGN PATENT DOCUMENTS

| | | |
|---|---|---|
| JP | 2002106694 A | 4/2002 |
| JP | 2004028185 A | 1/2004 |
| JP | 2008128435 A | 6/2008 |

* cited by examiner

CONTROL APPARATUS FOR AUTOMATIC TRANSMISSION

BACKGROUND

The present description relates to an automatic transmission for an automotive vehicle, and more particularly to a control apparatus for an automatic transmission.

In a case of an automatic transmission for an automotive vehicle, a valve body is arranged. A control valve mechanism which controls hydraulic pressures for engagement of frictional elements and other functions of the automatic transmission is installed in the valve body. It is common that a plurality of solenoid valves which actuates the control valve mechanism is attached to the valve body.

Also, it is common to provide an electronic controller which receives signals from various sensors and outputs control signals to the solenoid valves. It is known and, for example described in U.S. Pat. No. 6,530,856B1, that an electronic controller is also arranged in the transmission case. It is described in the '856 patent that a valve body is arranged in the bottom of the transmission case, a plurality of solenoid valves and an electronic controller are attached to the valve body as well as an oil temperature sensor, a speed sensor, etc. The prior art can simplify arrangement of a wiring harness which connects the electronic controller, the solenoid valves and the sensors.

However, in the prior art, the electronic controller may be located so close to the solenoid valves that electromagnetic waves generated by actuation of solenoid valves affect the function of a central processing unit and other electronic parts in the electronic controller.

Therefore, there is room to improve the arrangement of valve body, electronic controller and solenoid valves in the transmission case.

SUMMARY

The inventors herein have rigorously studied and unexpectedly found a novel arrangement of valve body, electronic controller and solenoid valves which solves disadvantages of the prior automatic transmission and presents further advantages.

Accordingly, there is provided, in one aspect of the present description, an automatic transmission comprising a transmission case, a valve body which is arranged in the transmission case, and a control valve mechanism which controls oil pressures in parts of the automatic transmission and is installed in the valve body. The automatic transmission further comprises a solenoid valve which is attached to the valve body, and is arranged at a first side of the valve body and in the transmission case, and an electronic control unit which controls the solenoid valve, is attached to the valve body, and is arranged at a second side of the valve body that is opposite to the first side across the valve body.

According to the first aspect, by arranging the solenoid valve at the first side of the valve body and the electronic control unit at the second side of the valve body which is opposite to the first side, the electronic control unit is separated from the solenoid valve, and the valve body is interposed between the electronic control unit and the solenoid valve. Therefore, even without any electromagnetic shield, the electromagnetic wave generated by the actuation of the solenoid valve can be shielded by the valve body and cannot affect the electronic control unit.

In embodiments, the first and second sides may be the lower and upper sides of the valve body, respectively, and a bottom of the transmission case may be configured to cause lubricating oil to reside above the solenoid valve. Accordingly, the solenoid valve can be in the oil and the vibration and noise generated by the activation of the solenoid valve can be absorbed with the damping effect of the lubricating oil. Also, heat generated at the solenoid valve can be released to the oil and the temperature of the solenoid valve can be more effectively controlled. Further, air is prevented from coming into the inside of the solenoid valve and more precise hydraulic control can be secured.

Further in the embodiments, an electromagnetic sensor which detects a change of magnetic field caused by a rotational member of the automatic transmission, for example one using a magnetic change detecting element such as a hall element and a semiconductor magnetic resistor element, may be arranged at the second side of the valve body opposite to the first side at which the solenoid valve is arranged. Accordingly, the valve body can decrease the affect of the magnetic field caused by the solenoid valve to the electromagnetic sensor and enhance the accuracy of the sensor measurement.

Still further in the embodiments, the automatic transmission may comprise a wiring harness which is formed in a film shape, connects the electronic control unit and the solenoid valve, and comprises an extendable portion. The wiring harness which runs at a side of the valve body is in a film shape or thin and the valve body can be prevented from interfering with the transmission even when a space between the outer surface of the valve body and the inner surface of the transmission case is small. Therefore, the valve body can be more easily installed and any damage to the wiring harness caused by the interference can be prevented. Further, since the wiring harness is provided with the extendable portion, the harness may not be stretched too much in assembling it to the valve body. Also, excessive tensile force may not act on the wiring harness when the valve body is thermally expanded, and any damage on the wiring harness can be prevented. As a result, the electronic control unit and the solenoid valve can be electronically connected securely enough even when there is a minimum space between the outer surface of the valve body and the inner surface of the transmission case.

DESCRIPTION OF EMBODIMENT

Hereinafter, an embodiment according to the present invention is described using the FIGS. 1 to 4.

Figure 1:
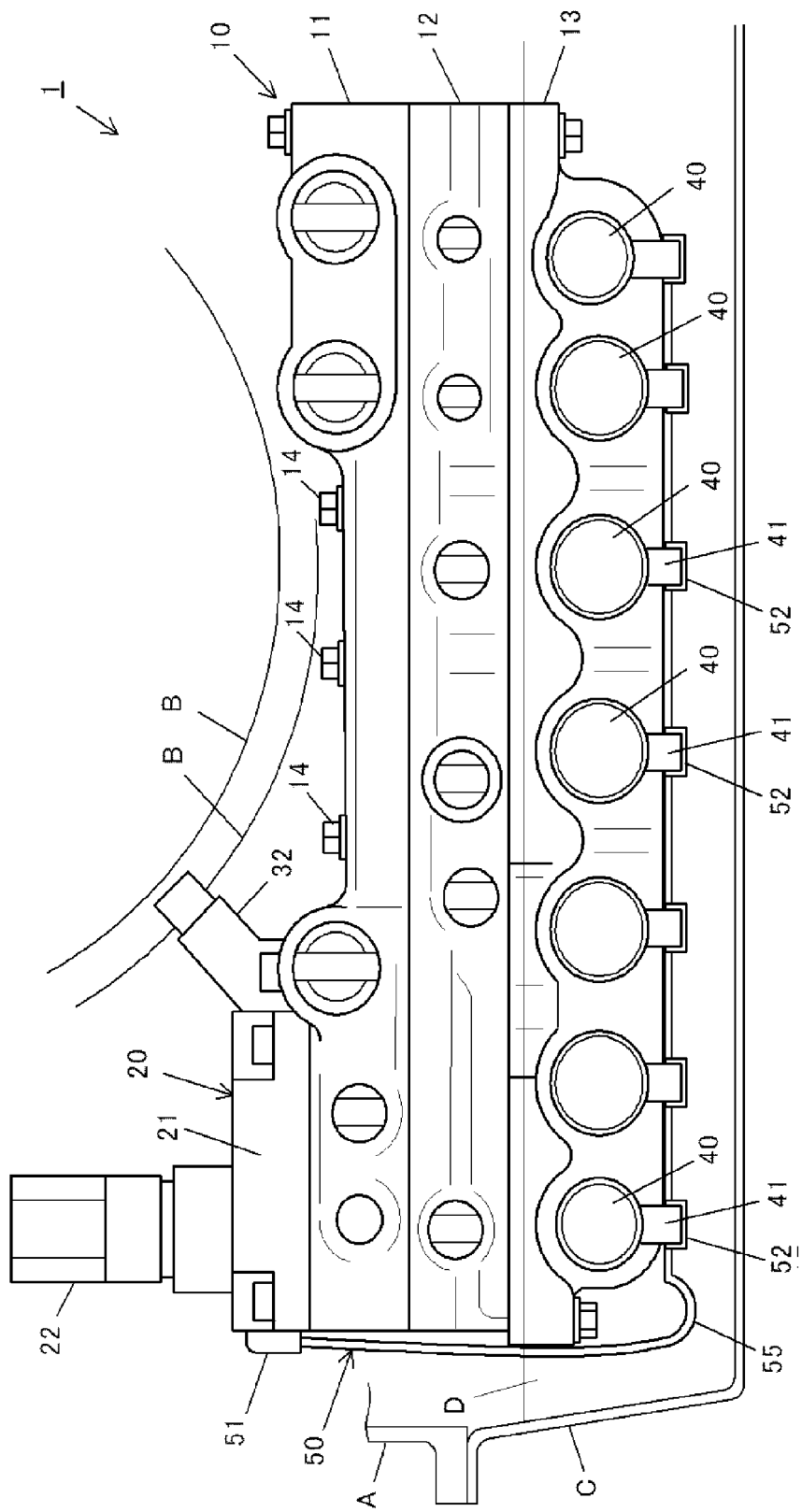
FIG. 1 is an elevational view of a valve body according to an embodiment of the present invention.

A control apparatus 1 of an automatic transmission according to this embodiment includes a valve body 10 arranged in an inside bottom part of a transmission case A (refer to FIG. 1). The valve body 10 is configured by laminating an upper layer member 11, a middle layer member 12, and a lower layer member 13. The members 11 to 13 are integrally coupled with each other by a number of bolts 14, sandwiching separate plates (not illustrated), respectively.

In the valve body 10 configured by the members 11 to 13, a control valve mechanism for controlling an oil pressure of the automatic transmission is incorporated, which is constituted with a plurality of valves and oil passages. A manual valve 15 configuring the mechanism includes an operation part 15a exposed to the outside of the valve body, and is incorporated in the upper layer member 11. The manual valve 15 moves cooperatively with the operation of a gear shift lever by an operator of a vehicle concerned, and switches between the oil passages of the control valve mechanism in response to a gear range selected by the operator.

Further, an electronic control unit (ECU) 20 and a sensor unit 30 are arranged in an upper surface of the upper layer member 11 of the valve body 10. The ECU 20 electronically controls the control valve mechanism according to a state of the gear range or the vehicle equipped with the automatic transmission. A collected connector 22 of wiring harnesses (not illustrated) led from various sensors arranged in respective parts of the vehicle is convexly arranged in an upper surface of a main body 21 of the ECU 20.

The sensor unit 30 is configured with a plurality of sensors for detecting states of respective parts of the automatic transmission, and includes rotation sensors 32 and 33 extending obliquely upward from a housing 31 of the sensor unit 30, and a position sensor (not illustrated) accommodated in the housing 31.

These rotation sensors 32 and 33 and the position sensor use a hall element for detecting a change of magnetic field to output a pulse signal, respectively. Tip end parts of the rotation sensors 32 and 33 and the position sensor are arranged adjacent to peripheral surfaces of two rotating members B (refer to FIG. 1), which configure the transmission mechanism of the automatic transmission, to detect rotation speeds of the members B based on the change of magnetic field associated with the rotations of these members B. Further, the position sensor detects the selected gear range based on the operating position of the manual valve 15.

The signals from the rotation sensors 32 and 33 and the position sensor are inputted to the ECU 20, and based on these signals and other signals indicating the states of respective parts of the vehicle inputted from the collected connector 22, a predetermined control is performed by the ECU 20.

A plurality of solenoid valves 40 such as a linear solenoid valve and an ON/OFF solenoid valve are attached to the lower layer member 13 of the valve body 10. These solenoid valves 40 are, in a state where rear parts thereof are exposed, inserted from front parts thereof into holes formed in a bottom part of the lower layer member 13 and horizontally attached to the bottom part of the lower layer member 13.

A wiring harness 50 (collected wiring harnesses described above) connects the ECU 20 arranged in the upper layer member 11 of the valve body 10 and the solenoid valves 40 attached to the lower layer member 13, respectively. The wiring harness 50 is arranged so as to extend through a side of the valve body 10 and bridge between the upper layer member 11 and the lower layer member 13.

Figure 2:
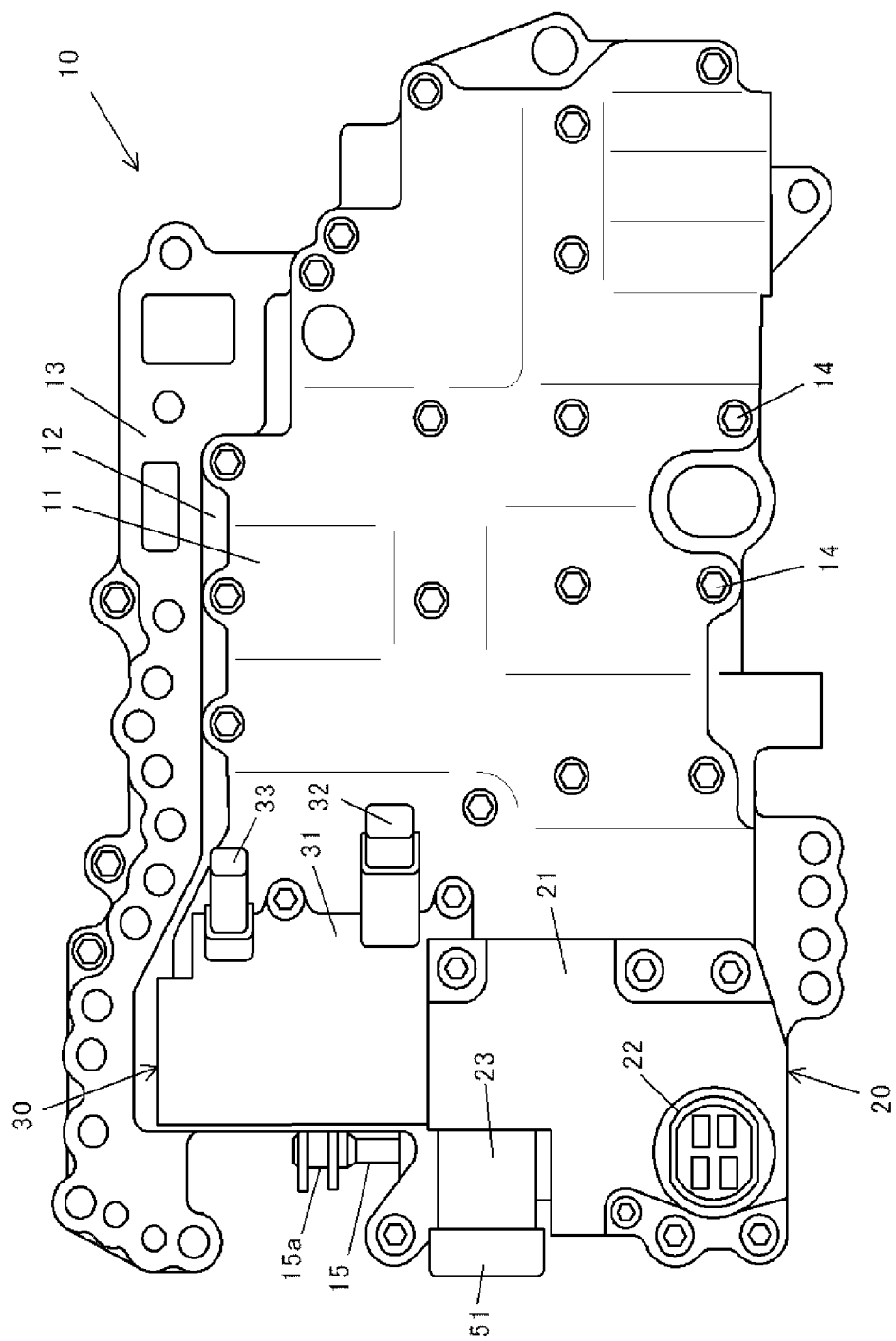
FIG. 2 is a plane view of the valve body shown in FIG. 1.

This wiring harness 50 is formed in a single flat film shape by collecting a plurality of lines, and provided with a collected connector 51 at an end thereof. As shown in FIG. 2, the connector 51 is connected to a wiring harness connecting part 23 provided to the ECU 20.

Figure 3:
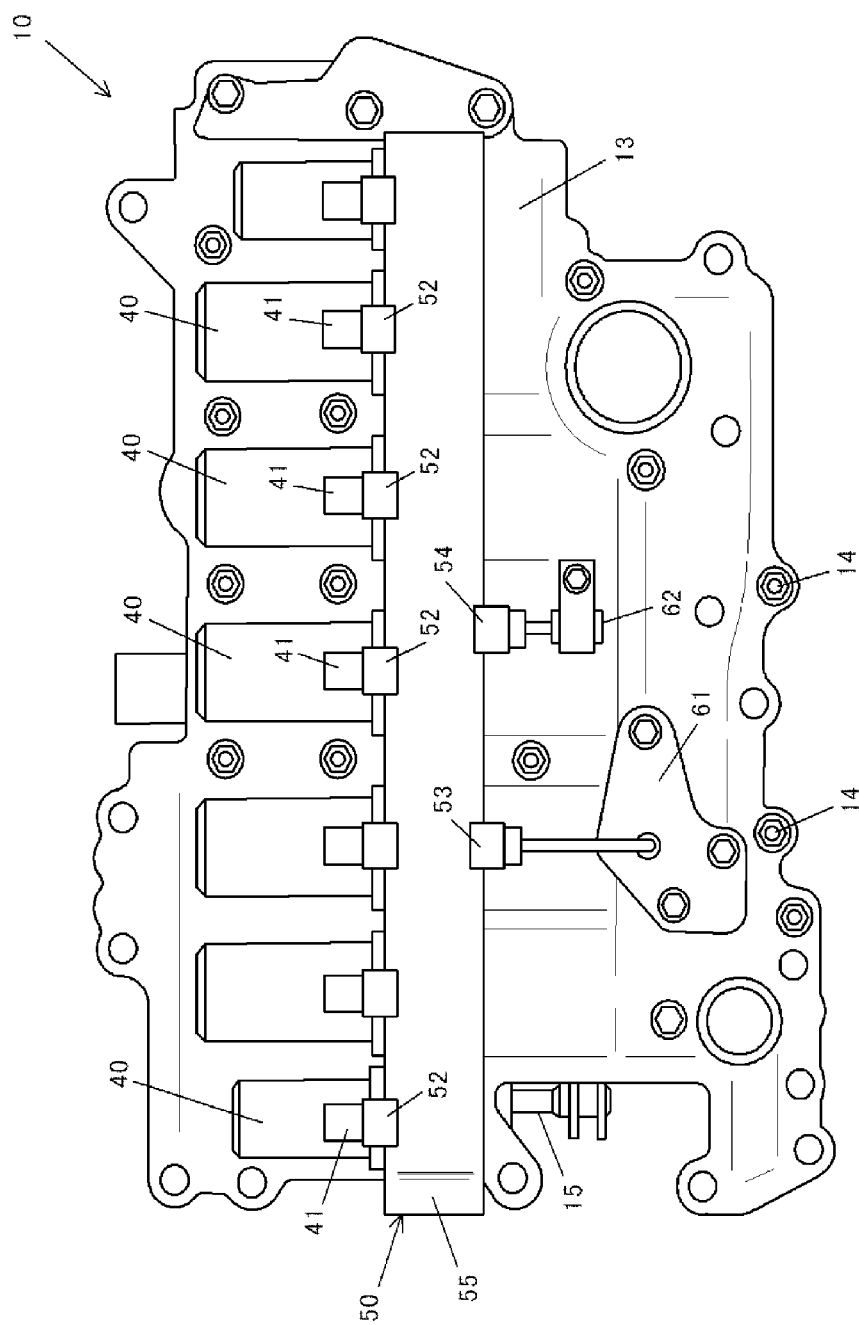
FIG. 3 is a bottom view of the valve body shown in FIG. 1.
Figure 4:
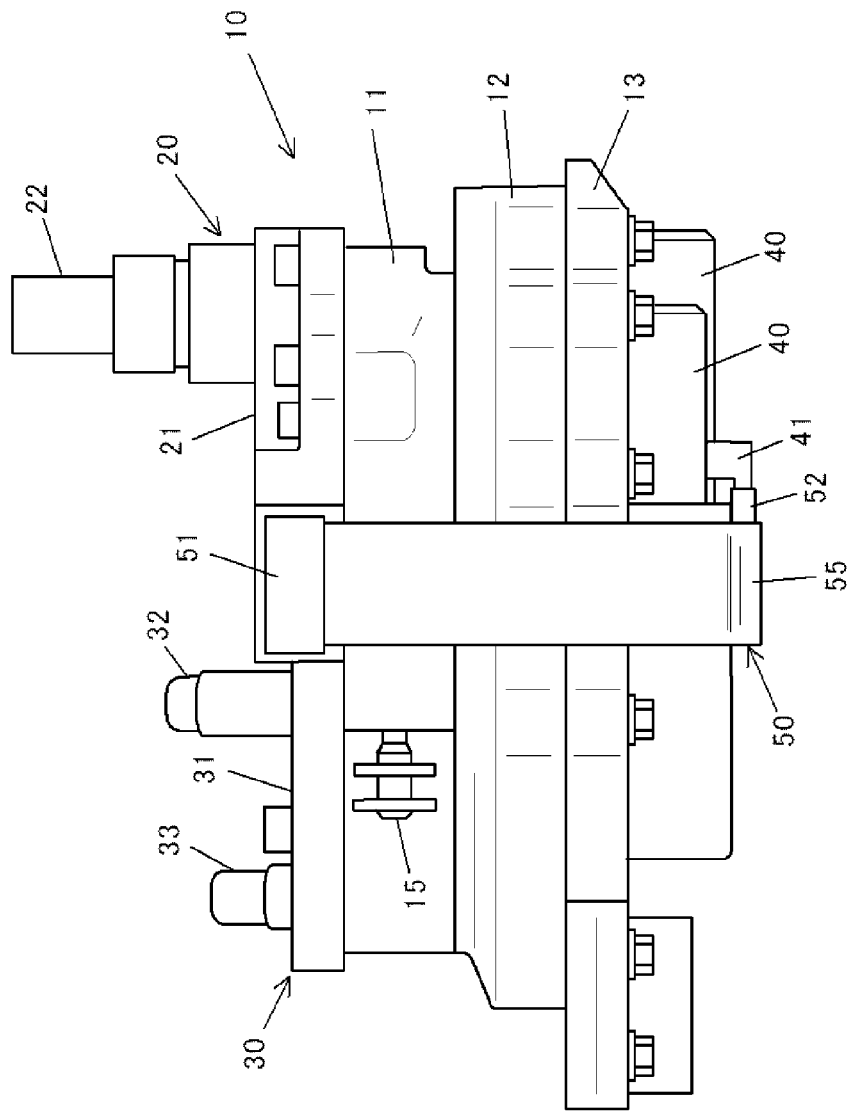
FIG. 4 is a left side view of the valve body shown in FIG. 1.

As shown in FIG. 3, independent connectors 52 of the same number as the solenoid valves 40 are provided on one side of a part of the wiring harness 50 where the part extends underneath the lower layer member 13 of the valve body. The connectors 52 are connected to wiring harness connecting parts 41 provided to the solenoid valves 40, respectively. Thereby, a control signal outputted from the ECU 20 is transmitted to each of the solenoid valves 40 via the wiring harness 50.

Two independent connectors 53 and 54 are provided on the other side of the part of the wiring harness 50 where the part extends underneath the lower layer member 13 of the valve body. A pressure switch 61 and an oil temperature sensor 62 attached to the lower surface of the lower layer member 13 are connected to the connectors 53 and 54, respectively. Signals from the switch 61 and the sensor 62 are inputted to the ECU 20 via the wiring harness 50.

A curved extendable portion 55 is provided in an intermediate section of the wiring harness 50. The extendable portion 55 maintains its shrunk state, while the collected connector 51 and the independent connectors 52 which are provided at both ends of the wiring harness 50 are connected to the wiring harness connecting part 23 of the ECU 20 and the wiring harness connecting parts 41 of the solenoid valves 40.

With the configuration described above, according to the control apparatus 1 of this embodiment, the ECU 20 generates the control signal according to respective states based on the signals inputted from the sensors arranged in respective parts of the vehicle via the wiring harness (not illustrated) connected to the collected connector 22, the signals from the rotation sensors 32 and 33, and the position sensor of the sensor unit 30, and the signals inputted from the pressure switch 61 and the oil temperature sensor 62 on the lower surface of the valve body 10 via the wiring harness 50, and outputs the signal to each of the solenoid valves 40 via the wiring harness 50. Therefore, each of the solenoid valves 40 is actuated to control the control valve mechanism or the automatic transmission according to the operating state and the like of the vehicle.

In this case, the ECU 20 is arranged in the upper surface of the upper layer member 11 in the valve body 10, and the solenoid valves 40 are arranged in the lower surface of the lower layer member 13 in the valve body 10. Therefore, the ECU 20 and the solenoid valves 40 are separated from each other, and the valve body 10 intervenes therebetween.

With the configuration described above, an electromagnetic wave generated due to the operation of each of the solenoid valves 40 is interrupted by the valve body 10. Thereby, the influence of the electromagnetic wave on the ECU 20 can be reduced without using a shielding member or the like, and the malfunction of the ECU 20 can be suppressed.

Moreover, the sensor unit 30, including the rotation sensors 32 and 33, and the position sensor which use the hall elements, is also arranged in the upper surface of the upper layer member 11 of the valve body 10. Therefore, the rotation sensors 32 and 33, and the position sensor receive less influence of the magnetic field generated by the solenoid valves 40 arranged in the lower surface of the lower layer member 13, and the false detection of the rotation speed and the position of the manual valve 15 caused by these sensors accidentally generating the pulse as a noise due to the change of magnetic field can be prevented.

The valve body 10 is arranged in the bottom part of the transmission case A, and the solenoid valves 40 are attached to the lower surface side of the lower layer member 13. Therefore, as shown in FIG. 1, these solenoid valves 40 are immersed in oil D inside an oil pan C attached to the bottom part of the transmission case A.

Therefore, by the damping effect of the oil D, vibrations and noises generated by the operation of the valves 40 can be absorbed, and a vibration and noise of the automatic transmission can be reduced. A heat generated by energizing coils of the solenoid valves 40 is released into the oil D to cool the solenoid valves 40, thereby the cooling capability for the solenoid valves 40 can be improved.

Moreover, because the solenoid valves 40 are immersed in the oil D, a suction of air into the solenoid valves 40 can be prevented. Thereby, disadvantages, such as the control accuracy degradation of the oil pressure caused by the suction of the air can be avoided, and the hydraulic control can be efficiently performed.

Meanwhile, the wiring harness 50 connecting the ECU 20 and the solenoid valves 40 is arranged along the side of the valve body 10 from the upper surface of the upper layer member 11 of the valve body 10 where the ECU 20 is arranged to extend to the lower surface of the lower layer member 13 of the valve body 10. Because the wiring harness 50 is formed in the film shape, when the valve body 10 is attached to the transmission case A, even if a gap between the valve body 10 and the transmission case A is small as shown in FIG. 1, the wiring harness 50 does not interfere with the transmission case A. Thereby, the assembability of the valve body 10 can be improved, and the damage on the wiring harness 50 due to the interference and the like can be prevented.

The extendable portion 55 is provided in the intermediate section of the wiring harness 50. Thereby, when wiring the wiring harness 50 to connect the collected connector 51 at one end and the independent connectors 52, 53, and 54 at the other end with the wiring harness connecting part 23 of the ECU 20, the wiring harness connecting parts 41 of the solenoid valves 40, the oil pressure switch 61, and the oil temperature sensor 62, the extendable portion 55 appropriately stretches, and can be arranged with some allowance, without the wiring harness 50 being forcibly pulled. Further, even when the valve body 10 expands by heat, the wiring harness 50 does not generate tension. Therefore, the damages and the like on the wiring harness 50 caused by being forcibly acted upon by tension can be prevented.

Meanwhile, for an adjustment and the like of the difference of the individual solenoid valves 40, a so called trimming may be performed. The trimming is performed, for example, in a state where each of the solenoid valves 40 is attached to the lower layer member 13 of the valve body 10, and then the solenoid valves and the ECU 20 are connected by the wiring harness 50. In this case, each of the members 11 to 13 of the valve body 10 are then coupled, and further, the ECU 20 connected to the wiring harness 50 is attached to the upper layer member 11. At this time, by the extendable portion 55, the ECU 20 can be attached without causing the tension in the wiring harness 50.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An automatic transmission comprising:
   a transmission case;
   a valve body which includes a plurality of valves and oil passages arranged in said transmission case;
   a control valve mechanism which controls oil pressures in parts of said automatic transmission and is installed in said valve body;
   a plurality of solenoid valves which are attached to said valve body, and arranged at a first side of said valve body and in said transmission case;
   an electronic control unit which controls said solenoid valves that is attached to said valve body and arranged at a second side of said valve body opposite to said first side across said valve body;
   a sensor unit attached to said valve body configured with a plurality of sensors, the sensor unit being arranged at the second side of said valve body opposite to said first side across said valve body and arranged side by side with the electronic control unit;
   a wiring harness that connects said electronic control unit and said solenoid valves, wherein the electronic control unit, a connector arranged on the electronic control unit for connecting the electronic control unit with sensors in respective parts of the vehicle, and the wiring harness that connects the electronic control unit and the solenoid valves are formed on one side of the transmission;
   a wiring harness connecting part that connects the electronic control unit to the wiring harness; and
   a manual valve arranged at the second side of said valve body opposite to said first side and positioned outside of said sensor unit and arranged side by side with said wiring harness connecting part.

2. The automatic transmission as described in claim 1, wherein said first side is a lower side of said valve body, said second side is an upper side of said valve body, and a bottom of said transmission case is configured to cause lubricating oil to reside above said solenoid valves.

3. The automatic transmission as described in claim 2, wherein said valve body is equipped with an electromagnetic sensor which detects a change of magnetic field caused by a rotational member of said automatic transmission, and wherein said electromagnetic sensor is arranged at said second side of said valve body.

4. The automatic transmission as described in claim 3, wherein the wiring harness is formed in a film shape and further comprises an extendable portion.

5. The automatic transmission as described in claim 1, wherein said valve body is equipped with an electromagnetic sensor which detects a change of magnetic field caused by a rotational member of said automatic transmission, and wherein said electromagnetic sensor is arranged at said second side of said valve body.

6. The automatic transmission as described in claim 5, wherein the wiring harness is formed in a film shape and further comprises an extendable portion.

7. The automatic transmission as described in claim 1, wherein the wiring harness is formed in a film shape and further comprises an extendable portion.

* * * * *